M. SKULSKI.
AUTO ELECTRICAL DISPLAY SIGNAL.
APPLICATION FILED JUNE 18, 1919.
1,360,039.
Patented Nov. 23, 1920.
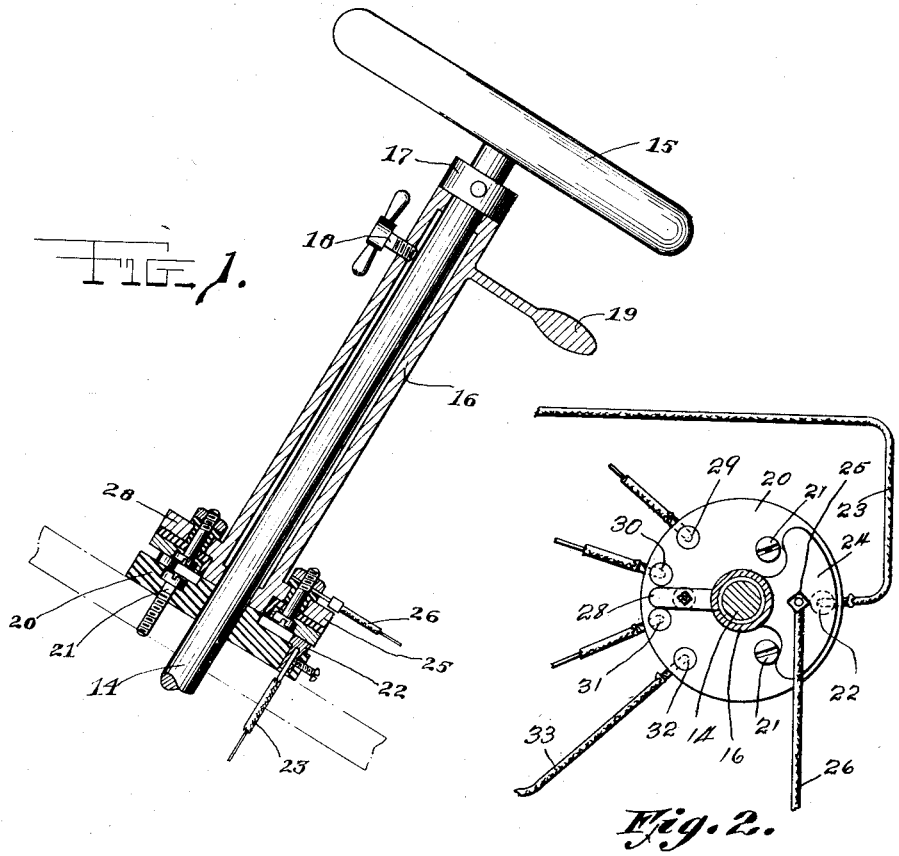
Inventor
Mateusz Skulski
By Adam E. Schatz
Attorney

UNITED STATES PATENT OFFICE.

MATEUSZ SKULSKI, OF MANSFIELD, OHIO.

AUTO ELECTRICAL DISPLAY-SIGNAL.

1,360,039.　　　　Specification of Letters Patent.　　Patented Nov. 23, 1920.

Application filed June 18, 1919.　Serial No. 305,168.

*To all whom it may concern:*

Be it known that I, MATEUSZ SKULSKI, a citizen of Poland, residing at 360 4th avenue, Mansfield, county of Richland, and State of Ohio, have invented certain new and useful Improvements in Auto Electrical Display-Signals, of which the following is a specification.

This invention has as its object the provision of a circuit controller adapted to be used for controlling the signal circuits on automobiles or the like.

Another object of the invention is to provide a controller of this class which is adapted to be secured to the steering post of an automobile within easy reach of the driver, and which can be operated by the driver without removing his hands from the steering wheel.

These and other like objects are attained by the novel construction and combination of parts hereinafter described, and shown in the accompanying drawings, forming a material part of this disclosure, and in which—

Figure 1 is a vertical sectional view through a steering post support to which the circuit controller according to the present invention is attached and, Fig. 2 is a top plan view of the circuit controller.

An automobile steering post 14, is provided with an operating hand-wheel 15, the post being positioned obliquely and engaged as usual with the steering devices of the machine. The steering post passes through a sleeve 16, provided with a collar 17, and set screw 18, by which the sleeve may be held in any desired adjustment, the sleeve being rotatable by an extending lever handle 19.

This sleeve rests upon a plate 20, having a raised central portion, and is secured by screws 21, to the foot board of the machine, the plate 20 being of non-conducting material and carries an insulating contact 22, engaged with a conductor 23.

Secured to the lower end of the sleeve 16 is a segmental plate 24, in the center of which is a binding screw 25 engaging the electric conductor 26, leading to a storage battery and opposite to the segmental plate 24, is an arm 28, contactable with any of a plurality of contact points 29, 30, 31, and 32. The segmental plate 24 is so shaped as to always be in contact with the terminal 22.

The conductor 23, leads to a socket 34, in which when arm 28 is moved to its extreme position in one direction it will make contact with the contact point 32 and the circuit will be closed to operate the signal on the left side of the automobile and if said arm 28 is brought into contact with the opposite point 29, circuit will be closed to operate the signal on the right hand side of the automobile.

When arm 28 is moved to make contact with the inner contacts 30 and 31, circuit will be closed to operate the signal at the rear of the automobile 32, conveying energy to the left hand signal through the conductor 33, causing the signal to glow. If the arm is in contact with the opposite point 29, the right hand signal will be illuminated by current through the conductor 23 and branch 40 from the conductor 39, so that the word "Stop" may be displayed.

The inner contacts 30 and 31 actuate the rear signals upon which "Right" and "Left" are displayed and will be shown according to the position of the arm with reference to the contact points.

In operation it is necessary merely to slacken the set-screw 18, and move the lever handle 19 so as to actuate the arm 28 to any desired position with respect to the contacts 29 to 32 inclusive, whereupon signals will be displayed at the front and rear of the vehicle, indicating the intention to stop or start, at the front, or to turn to right or left at the rear, the entire device being self contained and not dependent upon other functions of the vehicle or elements carried thereby.

Having thus described my invention, what I claim as new and desire to secure by Letters Patent, is—

In a circuit controller of the character described, the combination of a sleeve adapted to be secured to the steering post of an automobile, a non-conductive plate supporting said sleeve and having a raised central portion, a contact on said plate, a segmental plate secured to the lower end of said sleeve always in engagement with said contact, an arm oppositely disposed to said plate and a plurality of contacts adapted to be successively engaged by said arm for closing a circuit over the contacts, substantially as described and for the purpose set forth.

In testimony whereof I have affixed my signature.

MATEUSZ SKULSKI.